United States Patent [19]

Ferrio et al.

[11] Patent Number: 4,587,634
[45] Date of Patent: May 6, 1986

[54] DATA PROCESSING APPARATUS FOR MULTIPLE MODE OPERATION AS SPECIFIED BY USER INPUTS

[75] Inventors: Tom M. Ferrio; Floyd R. Gerwig, both of Lubbock, Tex.

[73] Assignee: Texas Instruments Incorporated, Dallas, Tex.

[21] Appl. No.: 450,835

[22] Filed: Dec. 20, 1982

[51] Int. Cl.[4] ............................................. G06F 15/02
[52] U.S. Cl. ..................................... 364/900; 364/192
[58] Field of Search ............... 364/200, 300, 900, 716, 364/192

[56] References Cited

U.S. PATENT DOCUMENTS

| | | | |
|---|---|---|---|
| 4,079,234 | 3/1978 | Kashio | 364/900 |
| 4,345,245 | 8/1982 | Vella et al. | 364/900 |
| 4,402,056 | 8/1983 | Sado et al. | 364/900 |
| 4,455,619 | 6/1984 | Masui et al. | 364/900 |

OTHER PUBLICATIONS

LISP, Pat. Winston & B. Horn 1981.
"PDP-11 Computer Family", pp. 85-94, Digital Equipment Corp., 1975.
Assembly Language Programming for the VAX-11, pp. 199-208, Lemone et al., 1983.

*Primary Examiner*—Gareth D. Shaw
*Assistant Examiner*—Daniel K. Dorsey
*Attorney, Agent, or Firm*—William E. Hiller; James T. Comfort; Melvin Sharp

[57] ABSTRACT

A data processing apparatus capable of operating in a plurality of modes includes a technique for automatically determining the proper mode from user inputs. This invention is most applicable to small hand held or desk top data processing apparatuses which operate in one mode like a calculator and which include provisions for entering, editing and running computer programs in a higher order language. User inputs, such as those from an ordinary keyboard, are stored in an input buffer memory until an end-of-entry key is actuated. Depending upon the nature of the end-of-entry key and the particular set of keyboard entries stored in the input buffer memory, the apparatus automatically determines the required mode for processing the data in the input buffer, enters that selected mode and peforms the function required by the input characters.

8 Claims, 3 Drawing Figures

DATA PROCESSING APPARATUS FOR MULTIPLE MODE OPERATION AS SPECIFIED BY USER INPUTS

BACKGROUND OF THE INVENTION

The present invention relates to a data processing apparatus capable of operating in a plurality of modes. Recently a new category of data processing apparatuses has entered the market which combines the characteristics of a calculator with that of a personal computer. These data processing apparatuses are typically hand held or small desk top machines capable of being placed within a brief case. These machines are capable of being programmed in a higher order computer language, such as BASIC. In addition to their capability of performing computer operations specified by a higher order language program, these machines typically also include many of the ordinary calculator functions included in a hand held calculator, such as addition, subtraction, multiplication and division. Machines of this type typically include alphanumeric keyboards capable of accepting user entries of strings of alphabetic characters specifying program commands in the higher order language, numeric characters and calculator type commands, such as addition, subtraction, multiplication and division.

Typically a data processing apparatus of this type will have several operating modes such as, a calculator mode, a program line entry/edit mode and a program run mode. Heretofore, these data processing apparatuses were constructed so that the user had to specify the mode of the machine prior to entry of any command or statement. Thus the user would be required to press one or more keys of the keyboard in order to place the machine in the program line entry/edit mode prior to manual entry of a set of program statements in the higher order language. Then the user would be required to exit the program entry mode and enter a program run mode via additional key inputs before this entered program could be run. Often the user would also be required to enter the program line entry/edit mode to debug or modify an existing program previously entered into the apparatus. In addition, if the user desired to operate the apparatus as an ordinary calculator, one or more of the keys must be depressed by the user in order to place the apparatus in the calculator mode, prior to entry of the numeric data and calculator type operational commands specifying the equation whose solution is desired.

This requirement for specifying differing operating modes arises at this time primarily because of the newly combined functions of the data processing apparatuses of this class. Heretofore, this combination of differing operational modes were not performed by a single machine. The prior art solution of providing one or more mode determination keys for setting the apparatus in the proper mode prior to entry of the particular commands in the specified mode solves the technical problem of placing the apparatus in the proper state to receive the desired commands. However, this solution to the technical problem introduces additional problems. Specifically, the user is now required to anticipate the mode in which the apparatus must be set and to remember to change the mode of the apparatus if it is not in the desired mode. The requirement for additional user inputs, that is inputs which do not form a part of the commands the user desires to be executed, introduces additional opportunity for user error and mistake and therefore reduces somewhat the utility of these apparatuses.

SUMMARY OF THE INVENTION

It is an object of the present invention to provide a means for automatically selecting the mode desired by the user for execution of user input characters by a data processing apparatus which is capable of operating in a plurality of differing modes. This technique for automatically causing the data processing apparatus to enter the proper mode is desired in order to eliminate the requirement that the operator provide specific entries to the apparatus in order to place it in the desired mode.

In a preferred embodiment of the present invention, user inputs are stored within an input buffer memory until one of a set of end-of-entry keys is depressed. Upon actuation of such an end-of-entry key, the data processing apparatus analyzes the input characters stored within the input buffer memory. This analysis is taken in order to determine the proper mode of the data processing apparatus based upon the nature of the input characters. Once the proper mode has been determined then the data processing apparatus is placed in this mode and the function specified by the data now stored within the input buffer memory is executed.

In a further embodiment of the present invention, the particular type of end-of-entry command received specifies to a certain degree the mode desired for the data processing apparatus. This form of automatic mode determination is particularly useful for program editing operations.

BRIEF DESCRIPTION OF THE DRAWINGS

These and other objects and aspects of the present invention will become clear from the following description taken in conjunction with the drawings in which.

DETAILED DESCRIPTION OF THE PREFERRED EMBODIMENT

Figure 1:
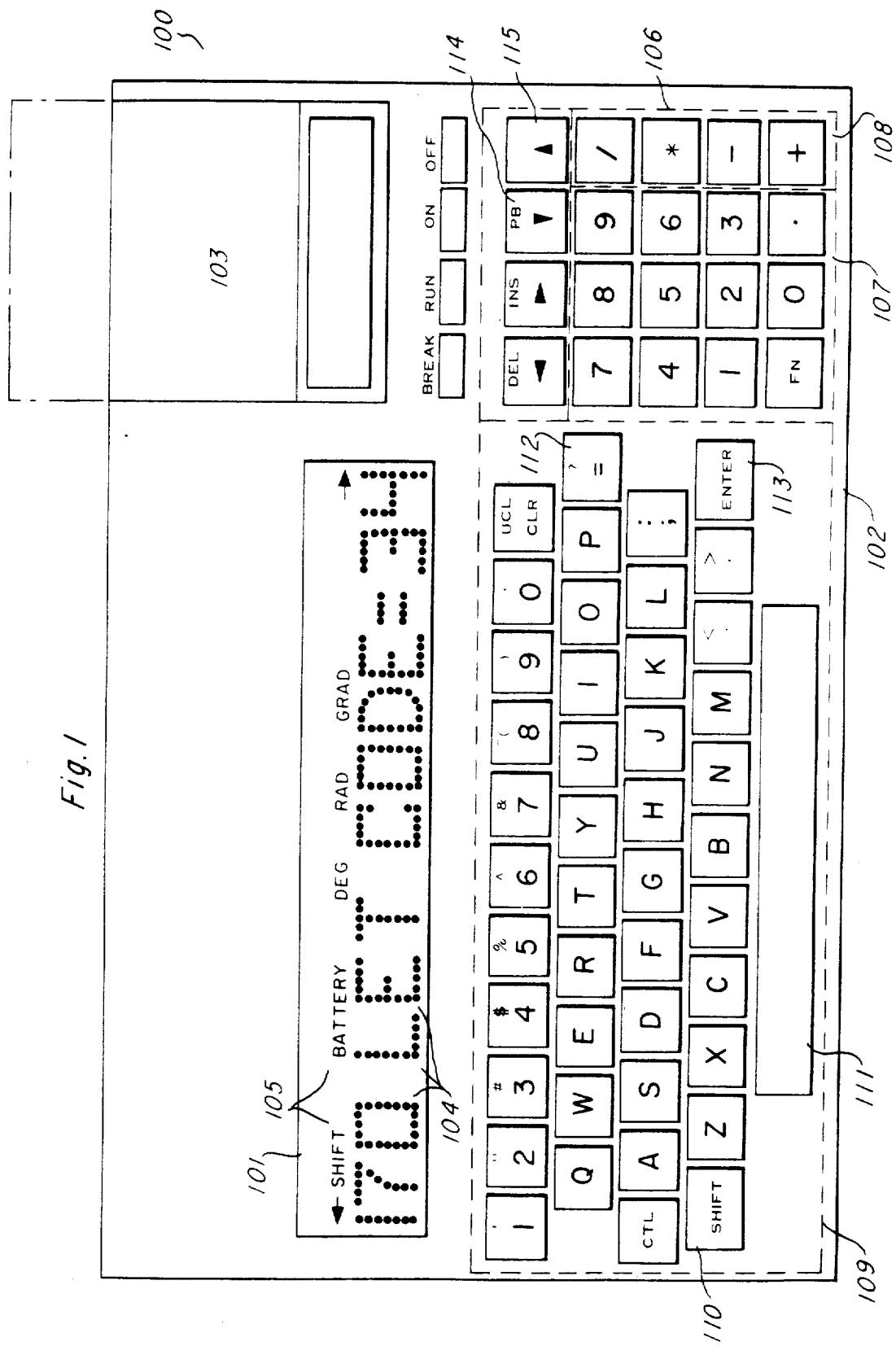
FIG. 1 illustrates the front panel of a data processing apparatus embodying the present invention.

FIG. 1 illustrates the front panel of a data processing apparatus such as may be employed to embody the present application. FIG. 1 illustrates data processing apparatus 100 having display 101 and keyboard 102. Display 101 is employed by data processing apparatus 100 to communicate the results of data processing operations to the user. Similarly, keyboard 102 is employed to enable the user to enter characters specifying data and commands into the data processing apparatus. Data processing apparatus 100 preferably can be operated as a stand alone apparatus, that is without any peripheral or auxiliary equipment, and FIG. 1 illustrates substantially all of the user/machine interface components of data processing apparatus 100 when so employed.

Data processing apparatus 100 includes module port 103. Module port 103 is advantageously employed to extend the capabilities of data processing apparatus 100 by permitting insertion of memory modules. A memory module may include read only memory having useful application programs. These application programs are accessed and executed by appropriate user inputs through keyboard 102. Module port 103 may also accomodate random access memory modules. Insertion of such random access memory modules increases the total amount of read/write memory of data processing apparatus 100. This may permit running of programs of greater length and/or the generation and storage of greater amounts of data. In particular applications, a memory module accommodated by module port 103 may include a combination of read only memory including application programs and random access memory for enhancing the capabilities of the basic apparatus.

Display 101 comprises a plurality of characters 104 and a plurality of indicators 105. Characters 104 are preferrably formed of dot matrix liquid crystal display devices. That is, each character position 104 includes a block of small liquid crystal display segments formed in an array having five vertical columns and seven horizontal rows. By application of signals for actuation or deactuation of individual ones of these thirty five segments, many different characters and symbols may be displayed including alphabetic characters numeric characters, mathematical symbols and the like. By adopting this form, together the plurality of characters 104 may display a wide variety of messages and/or computed results to the user. Indicators 105 are preferrably individually actuable liquid crystal display segments. These are actuated or deactuated as required to communicate to the user the present status of the data processing apparatus 100. Indicators 105 may be employed to communicate the current mode of interpretation of angular arguments for trigonometric functions of the apparatus, an indication of low battery voltage, or the like.

Keyboard 102 includes numeric/calculator section 106 and alphabetic section 109. Numeric/calculator section 106 includes numeric entry keys 107 which include keys for individual digits from 0 to 9 and a decimal point key. Numeric/calculator section 106 also includes a plurality of calculator function keys 108 such as an addition key, a subtraction key, a multiplication key and a division key. These keys enable the user to enter ordinary calculator commands for execution by the data processing apparatus 100.

Keyboard 102 also includes alphabetic entry keys 109. As illustrated in FIG. 1, alphabetic keys 109 are preferrably laid out in a QWERTY format. This format corresponds substantially to the format employed in typewriters and computer terminals, and therefore operators trained on these machines will have little difficulty in making entries into data processing apparatus 100. Alphabetic keys 109 preferrably includes a shift key 110 for defining additional functions for at least some of the other alphabetic keys 109, such as upper case letters and secondary functions listed above the numeric and punctuation keys. A space key 111 is employed for entering spaces in alphabetic text. Alphabetic keys 109 also includes several punctuation keys and relation keys such as an equals sign key 112. In addition to these keys alphabetic keyboard 109 includes several keys employed for specifying the end of an entry sequence. These end-of-entry keys include enter key 113, up arrow key 114 and down arrow key 115. The operation and function of these keys will be described further below.

Figure 2:
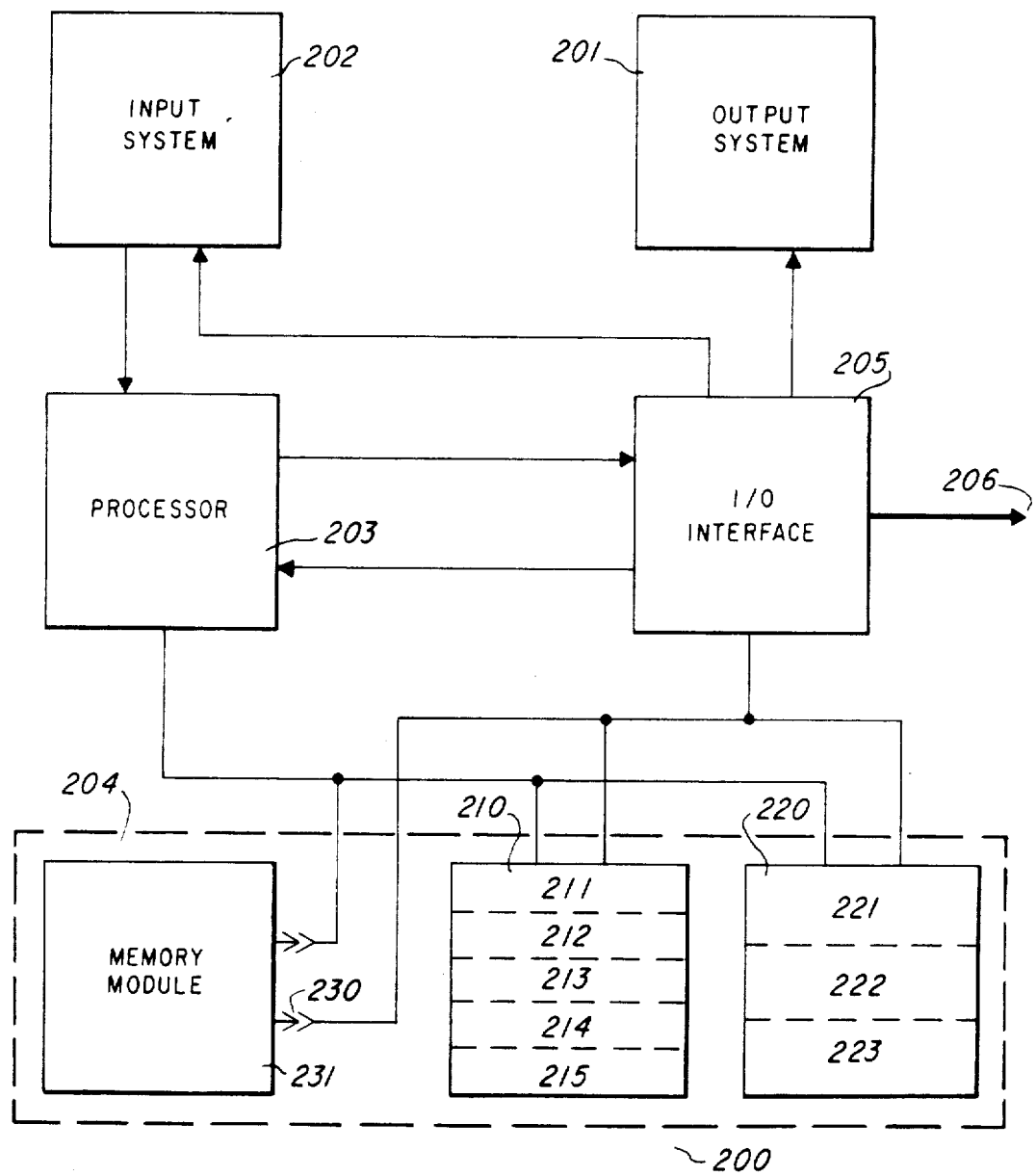
FIG. 2 illustrates the system block diagram of a data processing apparatus embodying the present invention.

FIG. 2 illustrates a block diagram of a preferred embodiment of data processing apparatus 200 constructed in accordance with the present application. Data processing apparatus 200 illustrated in FIG. 2 includes output system 201, which may comprise display 101 illustrated in FIG. 1, input system 202 which may be embodied by keyboard 102 illustrated in FIG. 1, processor 203, memory system 204 and input/output interface 205.

As explained above in conjunction with FIG. 1, output system 201 is employed to communicate results and messages to the user. Input system 202 is employed to receive data and program commands from the user.

Data processing apparatus 200 includes processor 203. Processor 203 may be embodied by an eight bit microprocessor or microcomputer chip. Processor 203 is constructed to perform the major data manipulation tasks required by data processing apparatus 200 under program control from instructions stored in memory system 204. That is, the particular set of instructions and data stored within memory system 204 is applied to processor 203 to cause processor 203 to perform the desired data processing functions.

Data processing apparatus 200 includes input/output interface 205. Input/output interface 205 is connected to display system 201, input system 202, processor 203, memory system 204 and I/O bus 206. Input/output interface 205 serves to coordinate and control the exchange of data and signals between the various subsystems of data processing apparatus 200 and between data processing apparatus 200 and other apparatuses via I/O bus 206. In particular, input/output interface 205 serves to control and coordinate the input of data and instructions from input system 202 to memory system 204 and hence for application to processor 203 and further coordinates the output of information to the user from memory system 204 via display system 201. In addition it is highly desirable to enable data processing apparatus 200 to exchange data and instructions with other apparatuses such as mass memory devices, additional output devices, such as a printer or the like, or other similar data processing apparatuses. Input/output interface 205 serves to generate the proper signals from data processing apparatus 200 for application to I/O bus 206 and further serves to properly detect and decode signals received from I/O bus 206.

Memory system 204 includes three major parts. These parts are read only memory 210, random access memory 220 and memory module 231 which is removably attached to data processing apparatus 200 via module port 230. The major functionality of data processing apparatus 200 is controlled by programs permanently stored within read only memory 210. Processor 203 includes a program counter for addressing specific memory locations within memory subsystem 204. Processor 203 operates by performing the functions defined by particular sets of program instructions stored in memory system 204 in conjunction with data input via input system 202, I/O bus 206 or stored within other portions of memory system 204.

Read only memory 210 includes operating system memory 211, calculator function memory 212, higher order language control memory 213 and input interpreter memory 214. In addition, read only memory 211 may optionally include one or more application programs stored in application program memory 215.

The basic operating system of data processing apparatus 200 is stored within operating system memory 211. This includes, for example, the procedures for initial start up of the apparatus upon initial application of electrical power, the particular manner of interpretation of input commands and data from input system 202 and the particular manner of generating signals for application to display system 201. In addition to the particular programs mentioned above, operating system memory 221 may include additional functions such as self test functions, memory management functions and other so called overhead functions.

In the preferred embodiment of data processing apparatus 200, calculator function memory 212 includes programs for interpretation and execution of ordinary calculator functions upon data entered via input system 202. These would include at least addition, subtraction, multiplication and division and may further include advanced functions such as logrithmic, exponential and trigonometric functions.

In addition to enabling such calculator functions upon direct entry from input system 202 via calculator function memory 212, read only memory 210 preferrably includes a higher order language control memory 213 storing programs related to the higher order language supported by data processing apparatus 200. The user is permitted to enter programs in a higher order language via input system 202 or I/O bus 206. In addition higher order language programs may be provided via memory module 231. Such a higher order language is constructed to aid the user in specification of application programs and is not particularly adapted for direct use by a particular processor. Therefore, this higher order language must be converted into a set of usually more detailed instructions in the instruction set supported by processor 203. The program for performing this conversion function is stored within higher order language control memory 213. Therefore, in a typical case the higher order language instructions are entered via the user from input system 202 and first stored within a portion of random access memory 206. Upon running of such a program, these instructions are converted using processor 203 and an interpreter or compiler program stored within higher order language control memory 213 into a set of instructions in the instruction set supported by processor 203. Thereafter, processor 203 executes this set of instructions by performing the particular application desired by the user. In addition of this function of converting a higher order language program into a form directly executable by processor 203, higher order language control memory 213 preferrably includes other control functions for storing an entered higher order language program in random access memory 220, for listing or editing an existing higher order language program stored in random access memory 220, or the like.

Read only memory 210 includes input mode interpreter memory 214. In accordance with the present invention the user is permitted to enter any command or statement supported by data processing apparatus 200 without the need to specify the mode of that command or statement. When the entry by the user of such a command or statement is completed by activation of an end-of-entry keystroke or keystroke sequence, the program stored in input mode interpreter memory 214 controls the determination of the mode appropriate to that entry. Thereafter control is passed to other portions of read only memory 210 (such as calculator function memory 212 or higher order language control memory 213) for proper interpretation and execution of the entry in the proper mode. Specfically, input mode interpreter memory 214 transfers control of processor 203 to that portion of read only memory 210 appropriate for the mode thus determined. This process will be further detailed in conjunction with FIG. 3.

Random access memory 220 is constructed in a manner which enables the user to both write into and read from particular memory locations within this memory. Random access memory 220 is preferrably employed for temporary storage of changeable programs and data. As mentioned above, random access memory 220 may be employed to store a particular program in a higher order language prior to its being converted into the instruction set of processor 203. In addition, random access memory 220 may also store programs therein in the instruction set supported by processor 203, either via entry from a peripheral via I/O port 206, direct entry from input system 202 or from a compiler program from higher order language control memory 213 or a similar compiler program stored in memory module 231. In addition, all data used in executing application programs and any or all intermediate results must be stored within particular memory locations within random access memory 220. This data is stored within the unassigned portion 223 of random access memory 220 under control of the particular application program then being executed.

The data currently being communicated to the user via display system 201 is preferrably stored within display memory 221, a part of random access memory 220. If it is desireable to communicate other data to the user then the data stored within display memory 221 which controls the data communicated via display system 201 is changed. In conjunction with input/output interface 205, the data stored within display memory 221 is converted into signals for causing output system 201 to communicate this data to the user. In the preferred embodiment this communication is via actuation and deactuation of appropriate segments within a plurality of liquid crystal display dot matrix characters.

In the preferred embodiment, at least some portion of random access memory 220 is nonvolatile, that is it retains the data stored therein when most portions of data processing apparatus 200 are turned off. This may be accomplished via application of electric power to the nonvolatile portion of random access memory 220 continuously whether the rest of data processing apparatus 200 is powered on or not. This feature permits the user to enter an application program into random access memory 220 which is retained for later use even after powering down the apparatus.

As explained above in conjunction with the description of FIG. 1, module port 230 is employed to connect to a removable memory module 231. Memory module 231 is employed to increase the functionality of data processing apparatus 200. Memory module 231 may include additional read only memory having additional application programs stored therein. This would enable the user to access additional application programs tailored for his particular use at that time which are not ordinarily stored within read only memory 210. Memory module 231 may include additional random access memory, thereby permitting greater program storage and/or greater data storage within data processing apparatus 200. Lastly, a combination of both additional read only memory and additional random access memory may be included within memory module 231, thereby permitting additional user programs and additional program and/or data storage area.

The invention of the present application operates via selective interpretation of inputs to data processing apparatus 200 via input system 202. In particular, a special portion of random access memory 220 is particularly defined to store lines of input characters from input system 202 prior to interpretation. This particular portion of random access memory 220 is input buffer 222. In a preferred embodiment of the present application, the data stored within input buffer 222 is also applied to display memory 221 which defines the data currently being communicated to the user. This enables the user to determine from output system 201 the particular input characters which have been entered. Therefore, the user can easily check to determine whether these entries are correct prior to actuation of the automatic interpretation of his input command. Upon actuation of one of a plurality of end-of-entry keys, which will be explained in further detail below, the interpretation of the data stored within input buffer 222 is begun. The procedure for interpretation of the data stored within input buffer 222 is preferably stored in input mode interpreter memory 214.

Figure 3:
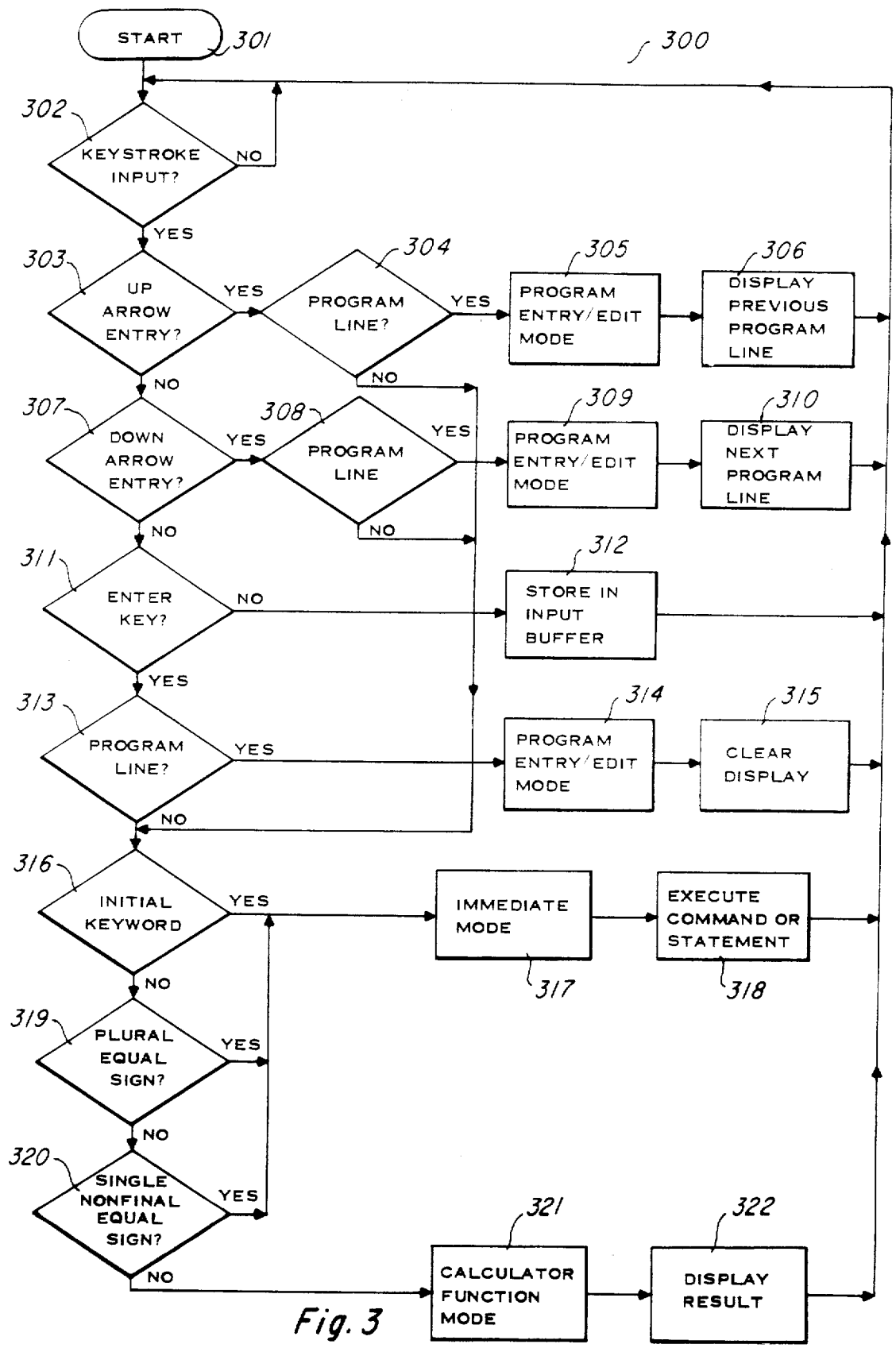
FIG. 3 is a flow chart illustrating the operation of the data processing apparatus in a preferred embodiment of the present invention.

An explanation of this input mode interpreter program appears in FIG. 3. FIG. 3 illustrates a flow chart of a preferred embodiment of this interpreter program stored within input mode interpreter memory 214. It should be understood that program 300 illustrated in FIG. 3 is not intended to illustrate the exact detailed processes required to implement the mode determination in any particular data processing apparatus. Rather, program 300 illustrates the overall general steps necessary to implement the present invention. One skilled in the art of construction of data processing apparatuses of the type to which this invention is applicable would be able to provide the detailed steps necessary to practice this invention from the following description once the design choices relating to the selection of processor, memory system and input/output interface were made.

FIG. 3 illustrates program 300. Program 300 is entered via start block 301. As noted above program 300 is preferrably stored in input mode interpreter memory 214. This entry of program 300 is preferably achieved after the data processing apparatus 200 has been placed in a known state, such as after execution of the initial power application routines stored in operating system memory 211. Program 300 tests to determine whether a keystroke input has been received (decision block 302). If a keystroke input has not been received then program 300 again tests for an input keystroke so that the data processing apparatus 200 is in a state awaiting user inputs.

In the case in which a keystroke input has been received then program 300 tests to determine whether this keystroke entry was an up arrow character (decision block 302). The entry of such an up arrow character serves to terminate that particular user entry and begin the interpretation of the particular user entry. The up arrow character serves a designation of the end of the user entry and further distinguishes this type of entry. Upon entry of an up arrow character, the data stored within the input buffer 222 is tested to determine if it can be interpreted as a program line in the higher order language (decision block 304). Particularly, such a program line must begin with a line number and include a program step which can be interpreted as an instruction in the higher order language. Thus the data stored in input buffer 222 must include an initial integer, followed by one or more spaces, further followed by an alphabetic character which could serve as the first character of a keyword in the higher order language or the first character of a variable name. If such is the case, the program entry/edit mode is entered and the data stored within input buffer 222 is inserted into random access memory 220 as a higher order language program line at a location related to the initial integer (processing block 305). This is preferably accomplished by branching to an appropriate location within higher order language control memory 213 where the program entry/edit program is stored. The memory location at which this new program line is stored is controlled by the relation of the line number (the initial integer) and the line numbers of previously stored program lines. If the new line number is the least line number, the new program line is stored prior to the old program lines by shifting the old program lines. Similarly, the new program line is inserted between previous program lines or added to the end of the previous lines if the new line number warrants. In the case in which the new line number coincides with the line number of a previously stored program line, the previously stored program line is replaced by the new program line.

After the successful storage of the new program line, program 300 then displays to the user the program line having the next lower program number (processing block 306). This displayed previous program line is also stored in input buffer 222. This enables the user to perform a similar editing function on this newly displayed line as was performed on the other line. After the apparatus is set in the state to display the next following program line then program 300 returns to decision block 302 to await the next keystroke entry.

In the event that the last received keystroke input was not an up arrow character, then program 300 tests to determine whether or not this last entry was a down arrow character (decision block 307). If this last entry was a down arrow character, then program 300 tests to determine if the data in input buffer 222 can be interpreted as a program line (decision block 308) in the same manner as described above. If the data is a program line, then the program entry/edit mode is entered and the new program line is stored in the proper location within random/access memory 220 in the manner described above (processing block 309). As before, this is preferably accomplished by branching to an appropriate location within higher order language control memory 213. In contrast to the operation upon actuation of the up arrow character, when the down arrow character is actuated, and after the execution of the required program entry/edit function, the data processing apparatus 200 is set into a state to display the next program line. This next program line is the program line having the line number next larger than the line number of the program line just entered. After the apparatus is placed into a state to display this previous program line, program 300 then returns to the start to await the next keystroke input.

In the event that neither an up arrow character nor a down arrow character has been entered, program 300 tests to determine whether the entry key has been actuated (decision block 311). In the event that the enter key has not been actuated, then the particular user entry is not yet complete. In such an event, the latest received keystroke is stored in input buffer 222 (processing block 312) and program 300 then returns to the start to await the next keystroke input. On the other hand, if an enter key has been received then the user entry is complete and must then be interpreted in accordance with the present invention.

Upon detection of actuation of the entry key, program 300 first tests to determine whether the data stored within input buffer 272 can be interpreted as a program line (decision block 313). As described above, provision of an initial interger followed by one or more spaces and further alphabetic characters which could be the first character of a keyword or variable name indicates that the data stored within input buffer 222 corresponds to a program line in the higher order language. Thus data processing apparatus 200 enters the program entry-edit mode (processing block 314), preferrably by branching to a proper location within higher order language control memory 213. This program line in the higher order language is then stored within random access memory 220. This adds an additional program line in the higher order language to any program already stored within random access memory 220 if no previous program line has this line number. The position of the just entered program line within the stored program is determined by the relation of the line number of this program line to the line numbers of the previously stored program. In the event that an old program line has the same line number as the just entered program line, the old program line is replaced by the new program line. These functions are controlled by the program entry/edit portion of the program. The data in the input buffer is then cleared in order to clear the display (processing block 315). The program in the higher order language is not run at this point, however, because the command for running the program has not yet been received. After storing this new program line, program 300 then returns to the start the next keystroke entry.

In the event that the data stored within input buffer 222 cannot be interpreted as a program line number (whether the entry is completed by an up arrow character, a down arrow character or an enter key), then program 300 tests to determine whether the data within input buffer 222 includes an initial keyword in the higher order language (decision block 316). The initial keywords correspond to commands or statements within the higher order language such as the commands RUN, NEW, LIST, EDIT or the statements LET, CALL, IF, and FOR. When these keywords are entered without being preceded by a program line number, the functions corresponding to these keywords are to be executed immediately. Therefore, program 300 causes these data processing apparatus 200 to enter the immediate mode by transfer of control to a proper location within higher order language control memory 213 (processing block 317) and to execute the command or statement within input buffer 222 (processing block 318). After this function is complete the program 300 returns to the start to await the next keystroke entry. Note that in the case of the entry of a command such as RUN or CONTINUE (in the case in which program execution has been stopped via a BREAK statement or command) the execution of this command may take considerable period and may involve execution of all or part of a stored program in the higher order language. In any event the processes performed corresponding to such entered keywords is controlled by higher order language control program 213.

Program 300 next tests to determine whether the data within the input buffer 222 includes a plurality of equal signs (decision block 319). If this data includes a plurality of equal signs, then program 300 interprets this as a command or statement for immediate execution and enters the immediate mode of higher order language control memory 213 (processing block 317) and executes the command or statement (processing block 318). Once this is accomplished program 300 returns to the start.

In the event that the data within input buffer 222 does not include a plurality of equal signs, program 300 tests to determine whether this data includes a single equal sign which does not appear at the end of the input data (decision block 320). If this data does include a single equal sign key which is not placed at the end of the entry, then the program 300 enters the immediate mode of higher order language control memory 213 via processing blocks 317 and 318 in the manner described above.

If the data within input buffer 222 does not include any equal signs, or if it includes a single equal sign at the end of the data, then program 300 interprets this data as an equation in the calculator mode (processing block 321). Note that a trailing equal sign, if it is stored within input buffer 222, is ignored. Therefore the user may enter or not enter an equal sign at the end of a calculator mode entry at the user's option. Note also that this is a default state, that is the entry is assumed to be in the calculator mode unless some part of the input causes it to be interpreted otherwise. In such an event the entry is evaluated as if it were a calculation for immediate execution such as is employed in a handheld or desk top calculator. This is preferably accomplished by branching to the start of the calculator function program stored within calculator function memory 212. After interpretation and execution of this command, program 300 causes data processing apparatus 200 to display the results (processing block 322). Thereafter, program 300 returns to the start to await the next keystroke input.

It should be clearly understood that the mode determination made by the program 300 stored in input mode interpreter 214 does not insure that the entry is error free. The various mode implementing programs (such as stored in calculator function memory 212 and higher order language control memory 213) must include their own error detection routines, perhaps with error messages corresponding to detected errors. This is similar to the prior art in which manual mode selection by the user does not insure that every entry is error free. However, this technique will elimnate errors caused by improper mode selection when the input would be proper if the corresponding mode had been selected.

What is claimed is:

1. A multimode data processing apparatus adapted for receiving program statements in any of said modes and for branching to a particular mode based upon the composition of said statements, comprising:

input means independent of a desired said mode for entering a program statement with a plurality of input characters including a plurality of alphanumeric characters which specify program lines in a higher order language and an alphanumeric character for specifying the end of the entry of input characters;

an input buffer coupled to said input means for temporarily storing input commands and statements from said input means;

an arithmetic logic unit operable in any of a plurality of data processing modes, including a program entry/edit mode responsive to said program statement for enabling selective entry and editing of program, said arithmetic logic unit coupled to said input buffer for executing data processing functions specified by said program statement stored in said input buffer in a selected data processing mode;

an input mode interpreter, coupled to said input buffer and said arithmetic logic unit and activated after entry of said program statement alphanumeric character specifying the end of entry, for selecting one of said plurality of data processing modes in dependence upon the program statement characters stored in said input buffer;

a read/write memory for temporarily storing data therein;

said input mode interpreter selectively operable to select said program entry/edit mode for allowing a user to store program lines in said higher order language in said read/write memory and to edit said program lines if said input mode interpreter determines that the input characters stored in said input buffer comprise a program line by ascertaining that the input characters comprises an initial numeric integer followed by at least one space and an alphabetic character; and said arithmetic logic unit operable to store the input characters stored in said input buffer in said read/write memory in a location determined by said initial numeric integer when said program entry/edit mode is selected.

2. The data processing apparatus of claim 1, wherein:

said character specifying the end of entry character is a previous-line edit character for indicating that a program line having a lower initial numeric integer than the data stored in said input buffer is to be edited or a next-line edit character for indicating that a program line having a higher initial numeric integer is to be edited in said program entry/edit mode when the data in said input buffer comprises a program line;

said data processing apparatus further comprising an output means for generating an operator perceivable indication of data;

in said program entry/edit mode said input mode interpreter selecting a previous-line edit mode if the end of entry character is a previous line edit character and a next-line edit mode if said end of entry character is a next-line edit;

said arithmetic logic unit further executing the data processing function of selecting data corresponding to the program line stored in said read/write memory having the next lower initial integer to the program line stored in said input buffer for output by said output means when said previous-line edit mode is selected; and said arithmetic logic unit executing the data processing function of selecting data corresponding to the program line stored in said read/write memory having the next higher initial integer to the initial integer of the data stored in said input buffer for output by said output means when said next-line edit mode is selected.

3. The data processing apparatus of claim 1, wherein:

said input mode interpreter selects an immediate execution mode for causing the data stored in the input buffer to be executed immediately if said input mode interpreter determines that the data stored in said input buffer includes an initial set of alphanumeric characters corresponding to a keyword in said higher order language; and said arithmetic logic unit immediately executes a data processing function of said higher order language corresponding to said keyword when said immediate execution mode is selected.

4. The data processing apparatus of claim 1, wherein:

said plurality of alphanumeric characters that may be entered via said input means includes an equals sign;

said input mode interpreter selects an immediate execution mode for causing the data stored in the input buffer to be executed immediately if said input mode interpreter determines that the data stored in said input buffer includes a plurality of equal signs; and said arithmetic logic unit immediately executes a data processing function of a higher order language corresponding to said data stored in said input buffer when said immediate execution mode is selected.

5. The data processing apparatus of claim 1, wherein:

said plurality of alphanumeric characters that may be entered via said input means includes an equals sign;

said input mode interpreter selects an immediate execution mode for causing the data stored in the input buffer to be executed immediately if said input mode interpreter determines that the data stored in said input buffer includes a single nonfinal equals sign; and an arithmetic logic unit immediately executes a data processing function of a higher order language corresponding to the data stored in said input buffer when said immediate execution mode is selected.

6. The data processing apparatus of claim 1, wherein:

said data processing apparatus further includes an output means for generating an operator perceivable indication of data;

said plurality of alphanumeric characters that may be entered via said input means includes an equals sign;

said input mode interpreter selects a calculator function mode for performing calculator function on the data stored in said input buffer if said input mode interpreter determines that the data stored in said input buffer does not include an initial numeric integer followed by at least one space and an alphabetic character, nor an initial set of alphanumeric characters corresponding to a keyword in said higher order language, nor plural equals signs, nor a single nonfinal equals sign; and said arithmetic logic unit executes a calculator function corresponding to data stored in said input buffer and generates a result data for output by said output means when said calculator function mode is selected.

7. A data processing apparatus capable of operating in a plurality of modes comprising:

input means for entering a plurality of input characters including a plurality of alphanumeric characters which specify program lines in a higher order language and an alphanumeric character for specifying the end of the entry of input characters;

an input buffer coupled to said input means for temporarily storing input commands from said input means;

a read/write memory for temporarily storing data therein;

output means for generating an operator perceivable indication of data;

an arithmetic logic unit operable in multiple modes including a program entry/edit mode, immediate execution mode and calculator function mode, said arithmetic logic unit coupled to said input buffer for storing said alphanumeric characters stored in said input buffer in said read/write memory when said program line entry/edit mode is selected, for immediately executing a data processing function of a higher order language corresponding to data stored in said input buffer when said immediate execution mode is selected and for executing a calculator function corresponding to data stored in said input buffer and generating a result for output by said output means when said calculator function mode is selected;

an input mode interpreter coupled to said input buffer and said arithmetic logic unit and activated by entry of the alphanumeric character specifying the end of entry for selecting either said program line entry/edit mode for allowing a user to store program lines in said higher order language in said read/write memory and to edit said program lines, said immediate execution mode for causing data stored in the input buffer to be executed immediately, or said calculator function mode for performing calculator functions on the data stored in said input buffer in dependence upon the input characters stored in the input buffer; and said input mode interpreter operable to select said program entry/edit mode if said input mode interpreter determines that the data stored in said input buffer includes an initial numeric integer followed by at least one space and an alphabetic character; and said arithmetic logic unit stores said data stored in said input buffer in said read/write memory at a location corresponding to said initial numeric integer when said program entry/edit mode is selected.

8. The data processing apparatus of claim 7, wherein:

said plurality of alphanumeric characters that may be entered via said input means includes an equals sign;

said input mode interpreter selects said immediate execution mode if said input mode interpreter determines that said data stored in said input buffer includes an initial set of alphanumeric characters corresponding to a keyword in said higher order language, or that said data stored in said input buffer includes a plurality of equals signs or that said data stored in said input buffer includes a single nonfinal equals sign.

* * * * *